R. E. DEWART.
BEET TOPPER.
APPLICATION FILED SEPT. 26, 1916.
1,253,358.
Patented Jan. 15, 1918.
3 SHEETS—SHEET 1.
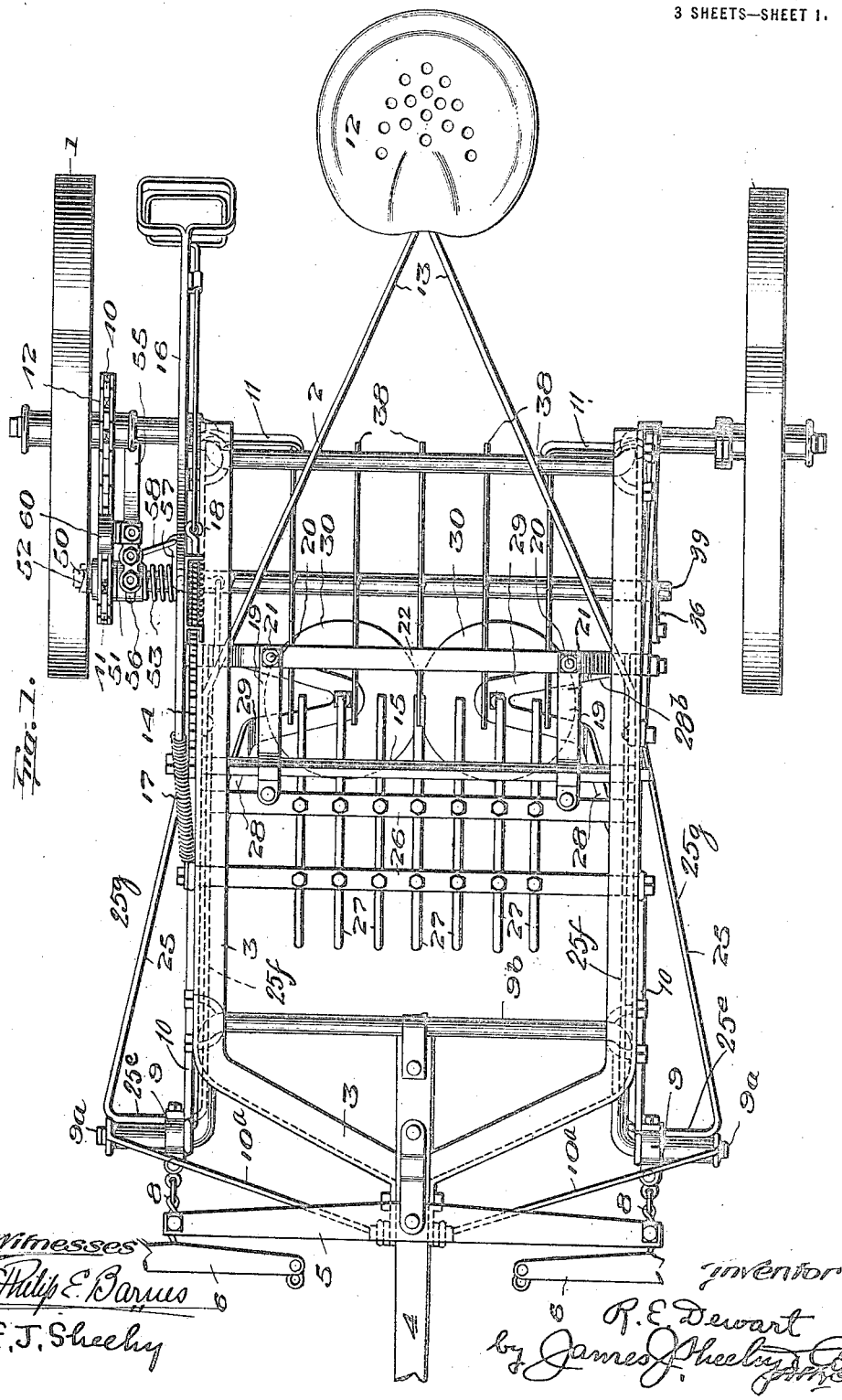

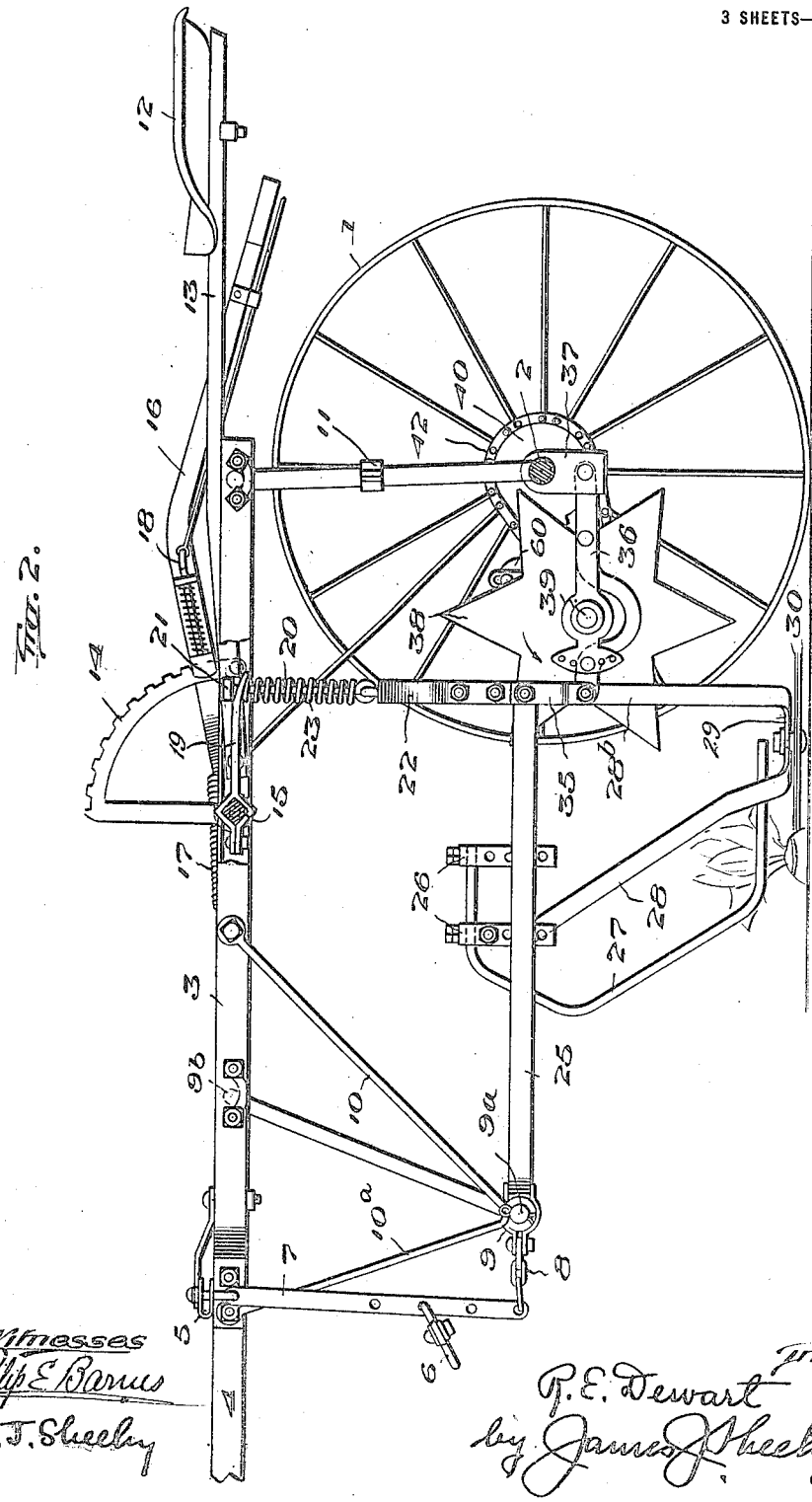

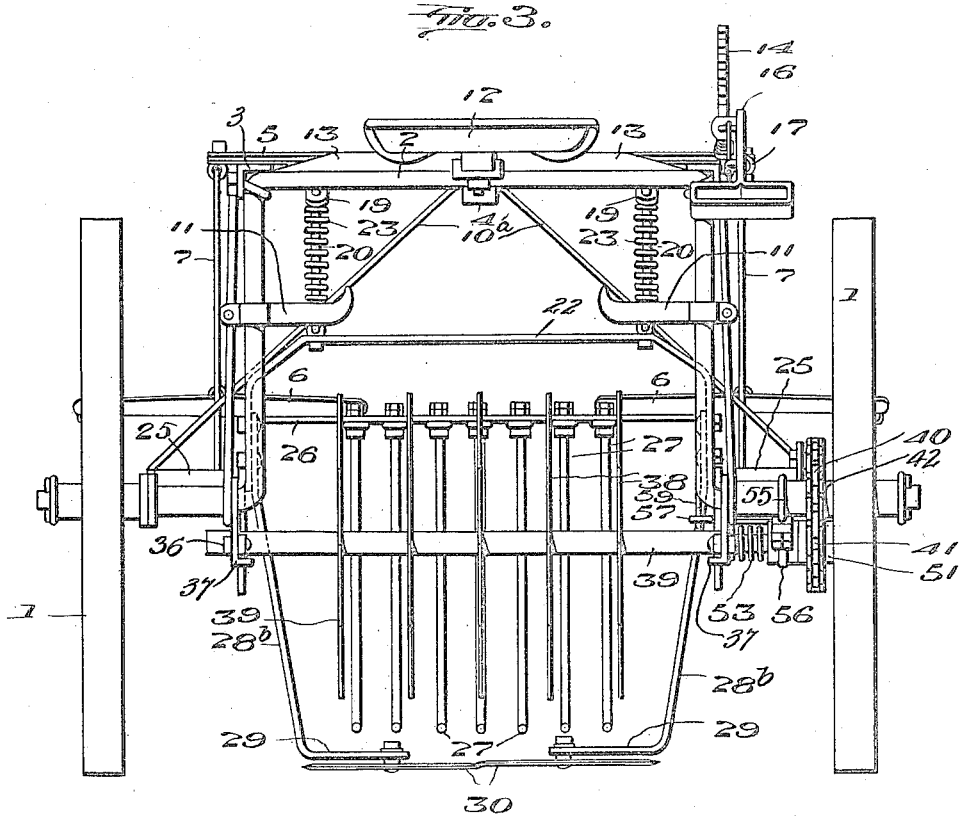
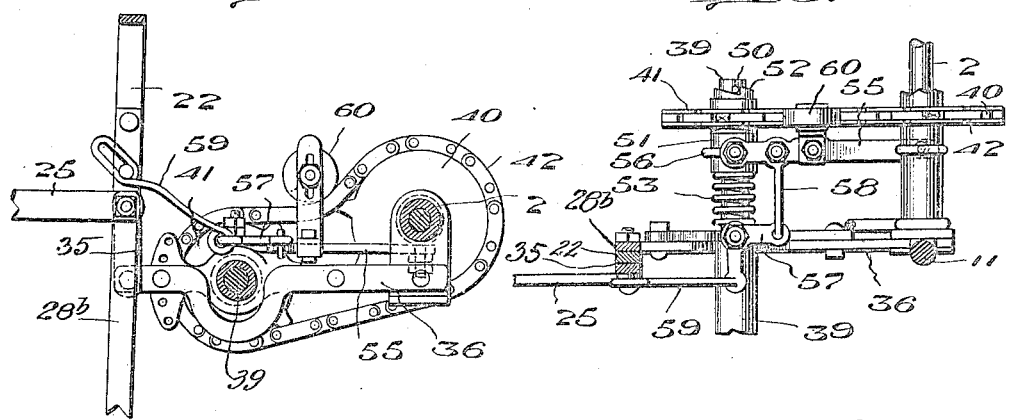

UNITED STATES PATENT OFFICE.

ROBERT E. DEWART, OF MILFORD, INDIANA.

BEET-TOPPER.

1,253,358.  Specification of Letters Patent.  Patented Jan. 15, 1918.

Application filed September 26, 1916.  Serial No. 122,254.

*To all whom it may concern:*

Be it known that I, ROBERT E. DEWART, a citizen of the United States, residing at Milford, in the county of Kosciusko and State of Indiana, have invented new and useful Improvements in Beet-Toppers, of which the following is a specification.

My present invention pertains to beet-topping machines; and it has for its general object to provide a simple, inexpensive, easily operated and durable beet-topping machine which is highly efficient because of its capacity to adjust itself automatically to the extent that beets protrude above the ground and also because of its ability to displace beet portions from the horizontal topping knives and the gage and to keep said elements clear so that the machine is adapted at all times to work to the best advantage.

The invention also contemplates the provision of a beet topper embodying rotary beater disks adapted to be driven from one of the ground wheels and also adapted to be raised and lowered, and means whereby when said disks are so raised the driving connection thereto will be automatically interrupted, and when the disks are restored to their working position said connection will be automatically reëstablished.

Other advantageous characteristics of the invention will be fully understood from the following description and claims when the same are read in connection with the drawings, accompanying and forming part of this specification, in which:

Figure 1 is a plan of the best practical embodiment of my invention that I have as yet devised.

Fig. 2 is a side view, partly in elevation and partly in longitudinal-vertical section.

Fig. 3 is a rear elevation of the machine.

Fig. 4 is a detail elevation of the clutch construction, with some elements in section.

Fig. 5 is a detail plan of said construction.

Similar numerals of reference designate corresponding parts in all of the views of the drawings.

My novel beet-topping machine is of the wheeled type, and its wheels 1 are carried on spindles at the lower ends of the side portions of an inverted U-shaped axle 2.

Fixed to the horizontal portion of the said axle and extending forwardly therefrom is a frame 3 to which a tongue 4 is connected, the said tongue being equipped with a double tree 5 on which are single trees 6, carried by bars 7 which depend from the end portions of the double tree, Fig. 2, and have their lower ends connected through links 8 with tubular bearings 9, mounted on journals 9ª at the ends of a depending transverse U-shaped frame portion 9ᵇ, the said journals 9ª being connected by bars 10 and 10ª with the frame 3 and the tongue 4 respectively.

The upright portions of the axle 2 are equipped with foot rests 11, and a driver's seat 12 is disposed in rear of the axle 2, and carried by a support 13 which extends forwardly over the axle 2 and is fixed to the side bars of frame 3.

Also fixed on frame 3 is a segmental rack 14, and journaled in bearings on the frame 3 is a transverse rock-shaft 15 to which is fixed a hand lever 16. Between said lever and the adjacent bar of frame 3 is a retractile spring 17 which is disposed in front of the lever, and carried by the lever is a detent 18 for coöperation with the rack 14 in adjustably fixing the lever in position.

Fixed on the rock shaft 15 and extending rearwardly therefrom are arms 19, and extending loosely through said arms are rods 20, equipped above the arms with nuts 21. At their lower ends said rods 20 are pivotally connected to a transverse bail 22, and on the rods 20 and interposed between the arms 19 and the said pivotal connections are coiled springs 23 the purpose of which is to yieldingly hold the bail 22 down in its working position and yet permit of said bail moving upwardly when necessary.

The tubular bearings or boxes 9 are carried at the forward ends of vertically-swinging arms 25, the rear ends of said arms 25 being connected to the depending portions of the bail 22 so that the bail 22 and the arms 25 constitute a unitary vertically-swinging frame which will hereinafter be referred to as such; it being understood that the said frame has its center of movement coincident with the journals 9ª.

The arms 25 are of loop form in plan— *i. e.*, respectively comprise a forward transverse portion or bight 25$^e$ connected to one tubular bearing 9, an inner rearwardly-extending portion 25$^f$ and an outer rearwardly-extending portion 25$^g$.

Fixed to and extending between the inner portions 25$^f$ of arms 25 of the vertically swinging frame are cross-bars 26 to which are fixed the upper portions of the downwardly and rearwardly extending fingers 27 which constitute the gage of my novel machine. Fixed to the said inner portions of the said arms 25 of the vertically movable frame are hangers 28, provided with inwardly extending horizontal portions 29 to which are pivotally connected the horizontal lapped topping knives 30, as shown.

It will also be noted here that the horizontal portions 29 merge into hangers 28$^b$ which at their upper ends are connected to the depending portions of the bail 22. The topping knives are in the form of circular disks.

Connected to the depending portions of the bail 22 and the rear ends of the arms 25 are hangers 35, and pivotally connected to and extending rearwardly from said hangers 35 are bars 36 the rear ends of which are fixed to hangers 37 pivoted on the inner portions of the spindles of the axle 2, and journaled in the said bars 36 are the end portions of a shaft 39 on which are fixed in spaced and staggered relation a plurality of toothed, vertically-disposed clearing beaters 38 which have for their function to displace the beet tops and clear the topping knives and the gage so that the machine will be in condition to operate to the best advantage at all times. The topping knives 30 are not driven. The clearing beaters 38, however, are driven from the right hand ground wheel 1, the driving connection being through a sprocket gear 40 fixed to the inner side of said wheel, a sprocket gear 41 loose on the adjacent end of the shaft 39, and a sprocket belt 42 connecting the said gears 40 and 41.

With a view to interrupting the said driving connection to the clearing beaters 38 when the vertically swinging frame is raised, and reëstablishing said connection when the vertically swinging frame is depressed to put the topping knives 30 and the clearing beaters 38 in working position, I provide the novel construction illustrated in detail in Figs. 4 and 5. The construction referred to comprises a stud 50 on shaft 39, a sleeve 51 which carries the sprocket gear 41 and has a clutch face 52 at its outer end designed to coöperate with the said stud 50, a spring 53 interposed between the inner end of the said sleeve and the adjacent bar 36 and adapted to normally hold said clutch face 52 in engagement with the stud 50, as shown in Fig. 5. Under this normal condition, it will be manifest that the shaft 39 and the clearing beaters 38 will be rotated so long as the sleeve 51 is clutched through its face 52 to the stud 50. When, however, the sleeve 51 is moved inwardly against the action of the spring 53 so as to disengage the clutch face 52 from the stud 50, the gear 41 will turn idly on the shaft 39, and the said shaft 39 and the clearing beaters 38 thereon will remain idle. When the sleeve 51 is moved outwardly on the shaft 39, the connection between the shaft 39 and the sprocket gear 41 will be reëstablished, and the shaft 39 and clearing beaters 38 will then be driven from the right hand ground wheel 1.

For the purpose of disengaging the sleeve 51 from the stud 50, I provide the horizontal lever 55 which is pivoted at its rear end to a connection on the adjacent axle spindle and has a circular portion 56 at its forward end disposed in a circumferential groove in the sleeve 51, a bell-crank 57 mounted on the adjacent bar 36, a link 58 connecting one end of said bell-crank and the lever 55, and a link 59 connecting the other arm of the bell-crank with the bail 22 of the vertically movable or swinging frame, the connection between the link 59 and the bail 22 being a loose connection formed specifically by the arrangement of a stud on bail 22 in a slot of link 59, Fig. 4, so that the connection is not affected by the upward movement of the vertically swinging frame against the cushioning means. Thus when said frame is raised by the hand lever 16, the sleeve 51 will be moved inwardly to interrupt the driving connection to the clearing beaters 38, while when the hand lever is moved downwardly to depress the vertically swinging frame, the two sets of devices and the gage, the sleeve 51 will be moved outwardly to reëstablish the driving connection between wheel 1 and the clearing beaters.

A wheel 60 on the arm 55 serves to take up slack of the sprocket belt 42.

In the practical operation of my novel machine, it will be manifest that when the machine is drawn by draft animals along a row of beets, the gage formed by the fingers 27 will ride over the beets and correctly position the topping knives 30 with respect to the beets irrespective of the extent to which the beets protrude above the ground. It will also be manifest that the springs 20 will permit the vertically swinging frame to move upwardly to accommodate the knives 30 to the beets, so that the beets caught between said knives will be neatly topped. It will further be manifest that coincident with the described operation of the topping knives 30 and the gage, the clearing beaters 38 will be driven in the direction indicated by arrow in Fig. 2, and consequently will operate to displace the beet tops and keep the gage and the topping knives at all times clear of the same so that the machine is adapted to operate to the best advantage at all times.

When it is desired to move the machine from one point to another, the vertically swinging frame is raised and secured in such position so as to elevate the topping knives and the gage, and at the same time interrupt the driving connection between the ground wheel and the clearing beaters 38.

It will be gathered from the foregoing that my novel machine is simple in construction, efficient in operation, and free of delicate parts such as are likely to get out of order after a short period of use.

The construction herein shown and described constitutes the preferred embodiment of my invention, but it is obvious that in the future practice of the invention various changes in the construction may be made within the scope of my appended claims.

Having described my invention, what I claim and desire to secure by Letters Patent, is:

1. The combination of an inverted U-shaped axle having spindles, wheels mounted on said spindles, a frame fixed to and extending forwardly from said axle, a transverse inverted U-shaped frame portion connected to the forward portion of said frame and having depending arms terminating in lateral journals, a vertically movable frame comprising a bail and arms connected to and extending forwardly from the bail and pivoted at their forward ends on said journals, a rock shaft arranged transversely in the first-named frame and having apertured arms, rods connected to the bail of the vertically-movable frame and extending loosely through said arms, coiled springs surrounding the rods and interposed between the bail and said arms, and means for adjustably fixing the said rock shaft with respect to the first-named frame.

2. The combination of an inverted U-shaped axle having spindles, wheels mounted on said spindles, a frame fixed to and extending forwardly from said axle, a transverse inverted U-shaped frame portion connected to the forward portion of said frame and having depending arms terminating in lateral journals, a vertically movable frame comprising a bail, arms connected to and extending forwardly from the bail, and boxes fixed to the forward portions of said arms and mounted on said journals, means for retaining the boxes on the journals, a rock shaft arranged transversely in the first named frame and having apertured arms, rods connected to the bail of the vertically-movable frame and extending loosely through said arms, coiled springs surrounding the rods and interposed between the bail and said arms, and means for adjustably fixing the said rock shaft with respect to the first-named frame.

3. The combination of a wheel-supported main frame, a vertically-movable frame disposed below the main frame and having forwardly-extending arms pivotally connected at their forward ends with the main frame, a rock-shaft arranged transversely in the main frame and having apertured arms, rods connected to the rear portion of the vertically movable frame and extending loosely through said arms, coiled springs surrounding the rods and interposed between the rear portion of the vertically-movable frame and said arms, and means for adjustably fixing the rock shaft with respect to the main frame.

4. The combination of a wheel-supported main frame, hangers depending from the forward portion of said frame and having lateral journals, a vertically-movable frame having arms pivoted at their forward ends on said journals, a rock-shaft arranged transversely in the main frame and having apertured arms, rods connected to the rear portion of said vertically movable frame and extending loosely through said arms, coiled springs surrounding the rods and interposed between said arms and the vertically movable frame, a lever on the rock shaft, a segmental rack on the main frame, and a detent carried by the lever and adapted to coöperate with said rack.

5. The combination of a main frame, ground wheels supporting the same, a vertically-movable frame connected with the main frame, means for adjustably fixing the vertically-movable frame with respect to the main frame, rotary means mounted in and movable vertically with the vertically-movable frame, a driving connection between one of the ground wheels and the rotary means; said driving connection being constructed and arranged to be interrupted and reëstablished, means for interrupting said driving connection when the vertically-movable frame is raised, and means for reëstablishing the driving connection when the vertically-movable frame is lowered.

6. The combination of a main frame, ground wheels supporting the same, a vertically-movable frame connected with the main frame, means for adjustably fixing the vertically-movable frame with respect to the main frame, rotary means mounted in and movable vertically with the vertically-movable frame, a driving connection between one of the ground wheels and the rotary means; said driving connection being constructed and arranged to be interrupted and reëstablished, means for interrupting said driving connection when the vertically-movable frame is raised, said means being loosely connected with the vertically-movable frame, means for reëstablishing the driving connection when the vertically-movable frame is lowered, and yielding means interposed between the vertically-movable frame and the said adjustably-fixing means.

In testimony whereof I have hereunto set my hand in presence of two subscribing witnesses.

ROBERT E. DEWART.

Witnesses:
J. H. GODSHALK,
FRANK S. SHEEHY.

Copies of this patent may be obtained for five cents each, by addressing the "Commissioner of Patents, Washington, D. C."